United States Patent
Stachewicz et al.

(10) Patent No.: US 9,610,829 B1
(45) Date of Patent: Apr. 4, 2017

(54) HYBRID MULTI-MATERIAL OUTERBELT REINFORCEMENT

(71) Applicant: Dura Operating, LLC, Auburn Hills, MI (US)

(72) Inventors: Aaron Brion Stachewicz, Harrison Township, MI (US); Alex Wayne Martin, Rochester Hills, MI (US); Suhant Prajwal Reddy Ranga, Northville, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 0 days.

(21) Appl. No.: 15/144,351

(22) Filed: May 2, 2016

(51) Int. Cl.
  *B60J 5/00* (2006.01)
  *B60J 5/04* (2006.01)
(52) U.S. Cl.
  CPC ........... *B60J 5/0481* (2013.01); *B60J 5/0423* (2013.01); *B60J 5/0444* (2013.01)
(58) Field of Classification Search
  CPC ....... B60J 5/0481; B60J 5/0423; B60J 5/0444
  USPC ............................. 296/146.5, 146.6; 49/502
  See application file for complete search history.

(56) References Cited

U.S. PATENT DOCUMENTS

| | | | | |
|---|---|---|---|---|
| 4,843,762 A * | 7/1989 | Grier | ...................... | B60J 5/0405 296/146.5 |
| 4,945,682 A * | 8/1990 | Altman | .................. | B60J 5/0405 296/146.5 |
| 5,762,394 A * | 6/1998 | Salmonowicz | ........ | B60J 5/0426 296/146.5 |
| 6,811,857 B1 | 11/2004 | Bravet et al. | | |
| 2011/0127797 A1* | 6/2011 | Garnett | ...................... | B60J 5/04 296/146.5 |
| 2014/0239668 A1* | 8/2014 | Ohsawa | ................. | B60J 5/0402 296/146.5 |

FOREIGN PATENT DOCUMENTS

| | | | | |
|---|---|---|---|---|
| DE | 19525347 C1 * | 7/1996 | ............. | B21D 47/01 |
| DE | 102015008261 A1 * | 12/2015 | ............. | B60J 5/0444 |
| FR | 2995861 A1 * | 3/2014 | ............. | B60J 5/0413 |
| FR | 2995865 A1 * | 3/2014 | ............. | B60J 5/0412 |
| FR | 3016143 A1 * | 7/2015 | ............. | B60J 5/0402 |
| JP | WO 2010092737 A1 * | 8/2010 | ............. | B60J 5/0426 |
| JP | WO 2015064259 A1 * | 5/2015 | ............. | B62F 25/105 |

* cited by examiner

*Primary Examiner* — Jerry Redman

(57) ABSTRACT

A hybrid multi-material outerbelt reinforcement assembly includes a metal body having a first leg and a second leg oriented at an angle with respect to the first leg. The second leg is integrally connected to the first leg defining a junction. A polymeric material reinforcing rib has a rib end contacting the junction and has a rib body extending away from the junction and bisecting the angle between the first leg and the second leg. The reinforcing rib has a rib length extending for substantially an entire length of the metal body. Flanges are integrally connected to the reinforcing rib, each having a first flange portion and a second flange portion each contacting the metal body to mitigate against a torsional rotation of the metal body that increases or decreases the angle of the second leg with respect to the first leg.

20 Claims, 3 Drawing Sheets

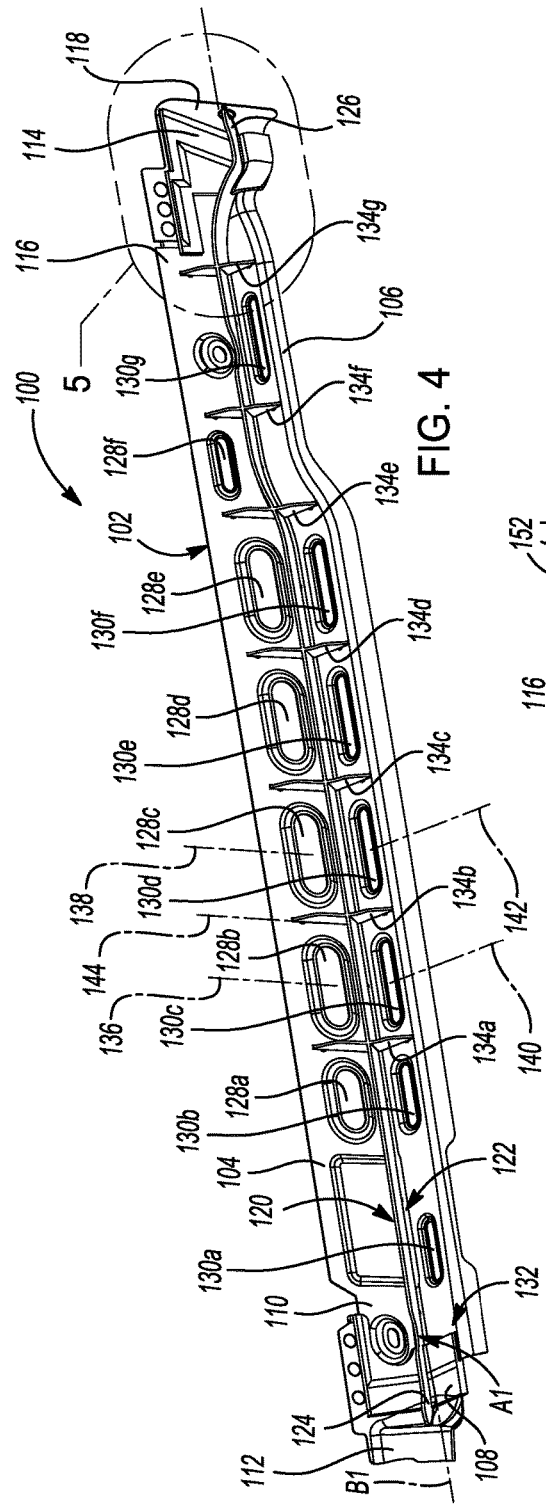
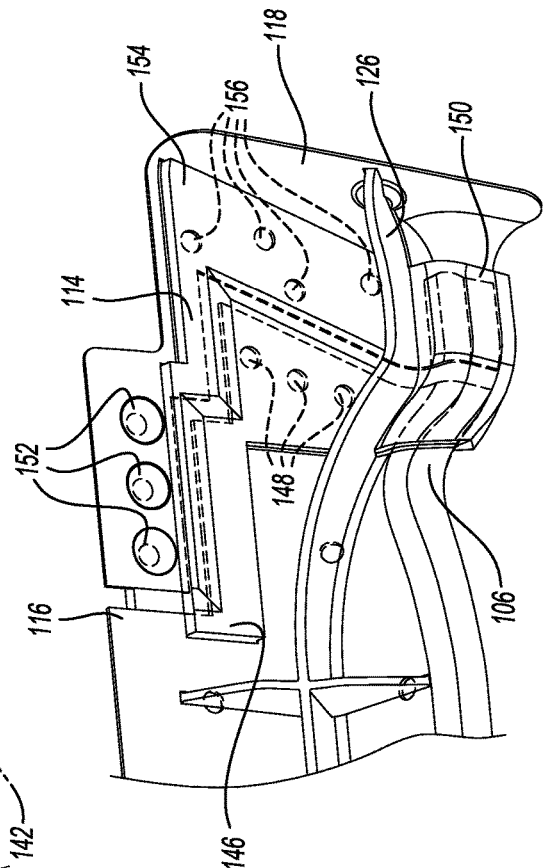
FIG. 4
FIG. 5

HYBRID MULTI-MATERIAL OUTERBELT REINFORCEMENT

FIELD

The invention relates generally to an outerbelt portion of a door frame of a motor vehicle.

BACKGROUND

The statements in this section merely provide background information related to the present disclosure and may or may not constitute prior art.

In common motor vehicle doorframe structures, an outerbelt portion normally spans front to rear at an intersection between the main doorframe body and a window frame. The doorframe normally includes a reinforcement member for collision load absorption, therefore known outerbelt designs do not include reinforcement to absorb side collision loading, but are intended to resist torsional loading of the doorframe, which can occur for example when the door is opened or closed. Known outerbelt designs are a stamping made from a single material such as steel or aluminum, which thereby permits welding to the doorframe. In order to minimize axial twisting under load, known outerbelts are typically formed in an approximate L-shape using a uniform thickness of material throughout both legs of the L-shaped body. Where weight reduction in the overall outerbelt is desired, one or more clear openings are created in the vertical leg of the outerbelt, without further modification of the surrounding material.

While known outerbelt designs are effective, this field can benefit from improved outerbelt designs.

SUMMARY

According to several aspects, a hybrid multi-material outerbelt reinforcement assembly includes a metal body, the body having a first portion and a second portion integrally connected to the first portion defining a junction. The second portion is oriented at an angle with respect to the first portion. A polymeric material reinforcing rib has a rib end contacting the metal body at the junction defined between the first portion and the second portion, and has a rib body extending away from the junction and spatially separated from each of the first portion and the second portion. Multiple flanges are integrally connected to the reinforcing rib. Each of the flanges is directly connected to both the first portion and the second portion to mitigate against a torsional rotation of the metal body that increases or decreases the angle of the second portion with respect to the first portion.

In one aspect, each of the multiple flanges includes at least one button positioned oppositely about the body with respect to the reinforcing rib and the flanges, the at least one button acting to frictionally retain the reinforcing rib and the flanges in direct contact with the body.

In another aspect, the multiple flanges each include a first flange member directly contacting the first portion of the body and a second flange member directly contacting the second portion of the body.

In another aspect, the at least one button defines a first button integrally connected to the first flange member and a second button integrally connected to the second flange member.

In another aspect, the at least one button defines multiple buttons each extending through one of multiple apertures created in the first portion or the second portion.

In another aspect, the multiple buttons are positioned oppositely about the body with respect to the flanges, the multiple buttons together acting to frictionally retain the reinforcing rib and the multiple flanges in contact with the body. Each of the multiple buttons individually extends through one of multiple apertures created in the body to integrally connect to one of the multiple flanges.

In another aspect, multiple clear openings are created in the first portion each having an opening centerline. Multiple clear openings are also created in the second portion, each having an opening centerline aligned with the opening centerline of one of clear openings of the first portion.

In another aspect, each of the multiple flanges is positioned between successive ones of the clear openings of both the first portion and the second portion.

In another aspect, a perimeter of each of the clear openings includes a lip raised with respect to a plane defined by either the first portion or the second portion having the clear opening. First and second polymeric material adapters are each connected to one of the opposed ends. First and second steel ends are each connected to one of the first or second adapters with the first and second steel ends adapted to be welded to a vehicle door frame. The reinforcing rib has a rib length extending for substantially an entire combined length of the body and the first and second adapters In another aspect, the reinforcing rib bisects the angle defined between the first portion and the second portion.

In another aspect, the reinforcing rib has a rib length extending for substantially an entire length of the body.

According to further aspects, a hybrid multi-material outerbelt reinforcement assembly includes a metal body. The body has a first leg and a second leg oriented at an angle with respect to the first leg. The second leg is integrally connected to the first leg defining a junction. A polymeric material reinforcing rib has a rib end contacting the junction between the first leg and the second leg and has a rib body extending away from the junction and bisecting the angle defined between the first leg and the second leg. The reinforcing rib has a rib length extending for substantially an entire length of the body. Multiple flanges are integrally connected to the reinforcing rib. Each of the flanges are directly connected to both the first portion and the second portion to mitigate against a torsional rotation of the metal body that increases or decreases the angle of the second portion with respect to the first portion.

In another aspect, a first button of each of the first flange portions fixes the first flange portion of each of the flanges to the first leg, and a second button of each of the second flange portions fixes the second flange portion of each of the flanges to the second leg.

In another aspect, the reinforcing rib, the flanges and each of the first button of each of the first flange portions and the second button of each of the second flange portions are all integrally joined during a single injection molding operation.

In another aspect, the first flange portion of each of the flanges is bonded to the first leg and the second flange portion of each of the flanges is bonded to the second leg.

In another aspect, the first flange portion is directly fixed to the first leg.

In another aspect, the second flange portion is directly fixed to the second leg.

In another aspect, the first flange portion of each of the flanges is bonded to the first leg and the second flange portion of each of the flanges is bonded to the second leg.

According to further aspects, a hybrid multi-material outerbelt reinforcement assembly includes a metal body, the body having a first leg and a second leg oriented at an angle with respect to the first leg. The second leg is integrally connected to the first leg defining a junction. Multiple clear openings are created in the first portion each having an opening centerline. Multiple clear openings are created in the second portion each having an opening centerline aligned with the opening centerline of one of clear openings of the first portion. A polymeric material reinforcing rib has a rib end contacting the junction between the first leg and the second leg and has a rib body extending away from the junction and bisecting the angle defined between the first leg and the second leg. The reinforcing rib has a rib length extending for substantially an entire length of the body. Multiple flanges are integrally connected to the reinforcing rib, each of the flanges having a first flange portion connected to the first leg and a second flange portion connected to the second leg to mitigate against a torsional rotation of the metal body that increases or decreases the angle of the second leg with respect to the first leg. Individual ones of the multiple flanges are positioned between successive ones of the clear openings of both the first portion and the second portion.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 4 is a front left perspective view of another aspect of a hybrid multi-material outerbelt reinforcement assembly; and FIG. 5 is a front left perspective view of area 5 of FIG. 4;

DETAILED DESCRIPTION

The following description is merely exemplary in nature and is not intended to limit the present disclosure, application, or uses.

Figure 1:
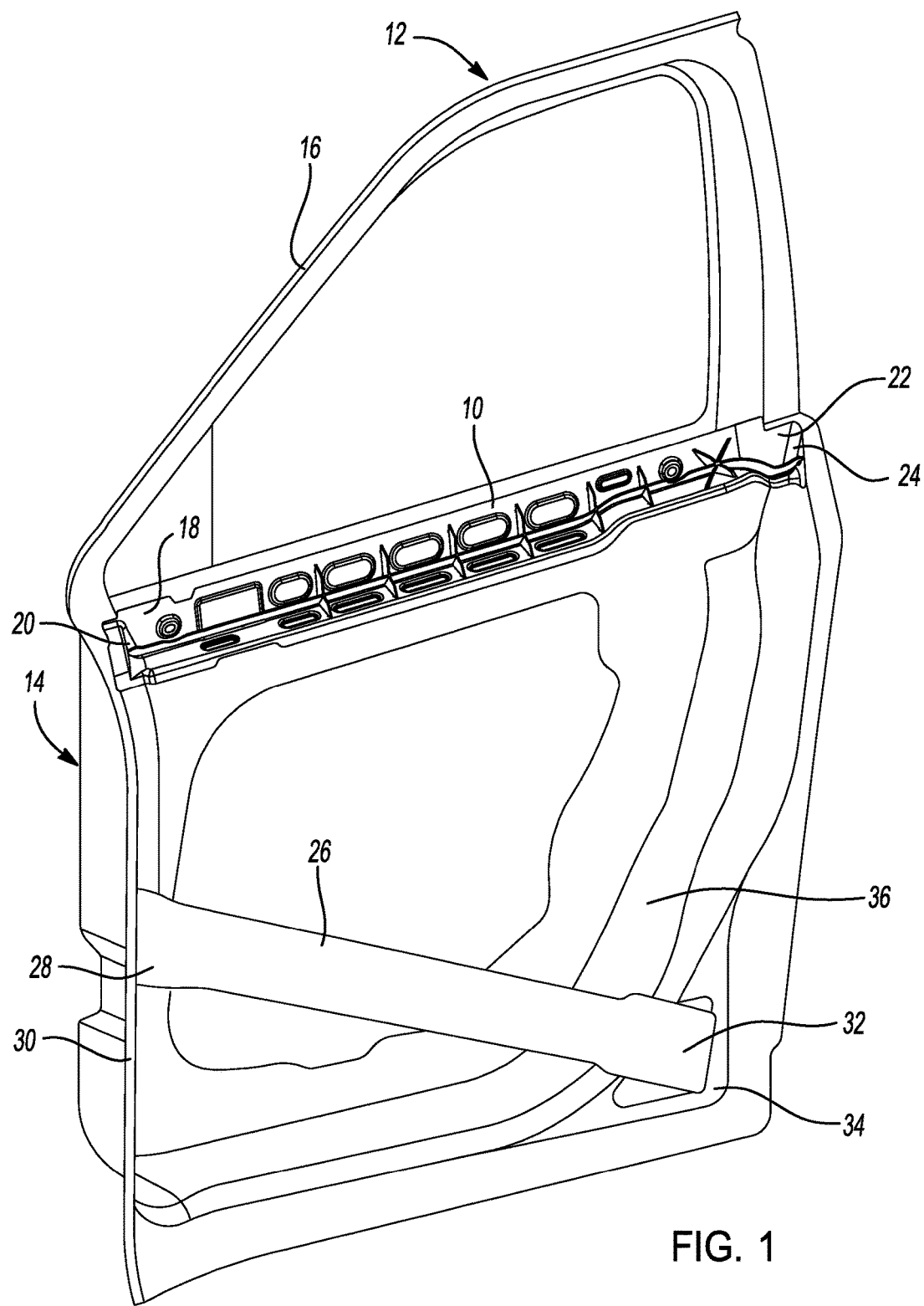
FIG. 1 is a front right perspective view of a motor vehicle door frame having a hybrid multi-material outerbelt reinforcement assembly of the present disclosure.

With reference to FIG. 1, a hybrid multi-material outerbelt reinforcement assembly is generally indicated by reference number 10. According to several aspects, the outerbelt reinforcement assembly 10 is a structural member of an exemplary door frame 12 used in a motor vehicle (not shown). The outerbelt reinforcement assembly 10 is positioned between a main frame section 14 of the door frame 12 and a window frame section 16. The outerbelt reinforcement assembly 10 is connected, for example by welding or riveting, to the main frame section 14 of the door frame 1. The outerbelt reinforcement assembly 10 includes a metal first end 18 which is fixed to a first frame member 20 of the door frame 12 and includes a metal second end 22 which is fixed to a second frame member 24 of the door frame 12. The outerbelt reinforcement assembly 10 can also be used to support door components such as a door lock mechanism, window operating switches, and the like, and may also support other items (not shown) such as but not limited to wiring harnesses, ventilation components or ducting, and the like.

The door frame 12 can also include reinforcement members such as a cross brace 26 which is fixed at a first end 28 to a third frame member 30 and is fixed at a second end 32 to a fourth frame member 34. Structurally, the outerbelt reinforcement assembly 10 is relied on to mitigate against twisting and torsional displacement of the door frame 12. Such displacement can occur for example when a torsional load is applied to the window frame section 16 by a vehicle occupant during door opening or closing. A geometry of the outerbelt reinforcement assembly 10 is therefore selected which mitigates against longitudinal twisting, as will be described in greater detail in reference to FIGS. 2 and 3. The outerbelt reinforcement assembly 10 also provides an upper wall for door frame 12 also includes a cavity 36 below the outerbelt reinforcement assembly 10 which provides space for equipment such as a window motor and a window (not shown) when in a window lowered position.

Referring to FIG. 2 and again to FIG. 1, in one aspect the outerbelt reinforcement assembly 10 includes body 37 having a first member or leg 38 which is integrally connected to a second member or leg 40 defining a junction "A" between the first leg 38 and the second leg 40. The body 37 can be made for example from a metal such as steel, and can be formed for example by a stamping operation. To reduce a weight of the outerbelt reinforcement assembly 10, at least one and according to several aspects multiple clear openings such as clear openings 42*a*, 42*b*, 42*c*, 42*d*, 42*e*, 42*f* are created in the first leg 38. To reinforce the first leg 38 for the material removed to create the clear openings, each of the clear openings 42*a*, 42*b*, 42*c*, 42*d*, 42*e*, 42*f* is also provided with a raised lip, for example a raised lip 44 defined at the clear opening 42*c*. The raised lips 44 are material of the first leg 38 proximate to the clear openings which is raised with respect to a plane defined by the first leg 38. The first leg 38 can also be provided with assembly alignment apertures such as a first alignment aperture 46 and a second alignment aperture 48. The first alignment aperture 46 and the second alignment aperture 48 receive alignment pins (not shown) used during installation of the outerbelt reinforcement assembly 10 prior to welding or fastening, to retain the intended position of the outerbelt reinforcement assembly 10 during installation.

To further reduce a weight of the outerbelt reinforcement assembly 10, at least one and according to several aspects multiple clear openings such as clear openings 50*a*, 50*b*, 50*c*, 50*d*, 50*e*, 50*f* are created in an upward facing, substantially horizontal face 52 of the second leg 40. To reinforce the second leg 40 for the material removed to create the clear openings, each of the clear openings 50*a*, 50*b*, 50*c*, 50*d*, 50*e*, 50*f* is also provided with a raised lip, for example a raised lip 54 defined at the clear opening 50*d*. The raised lips 54 are material of the second leg 40 proximate to the clear openings 50*a*, 50*b*, 50*c*, 50*d*, 50*e*, 50*f* which is raised with respect to a plane defined by the face 52 of the second leg 40.

Figures 2, 3:
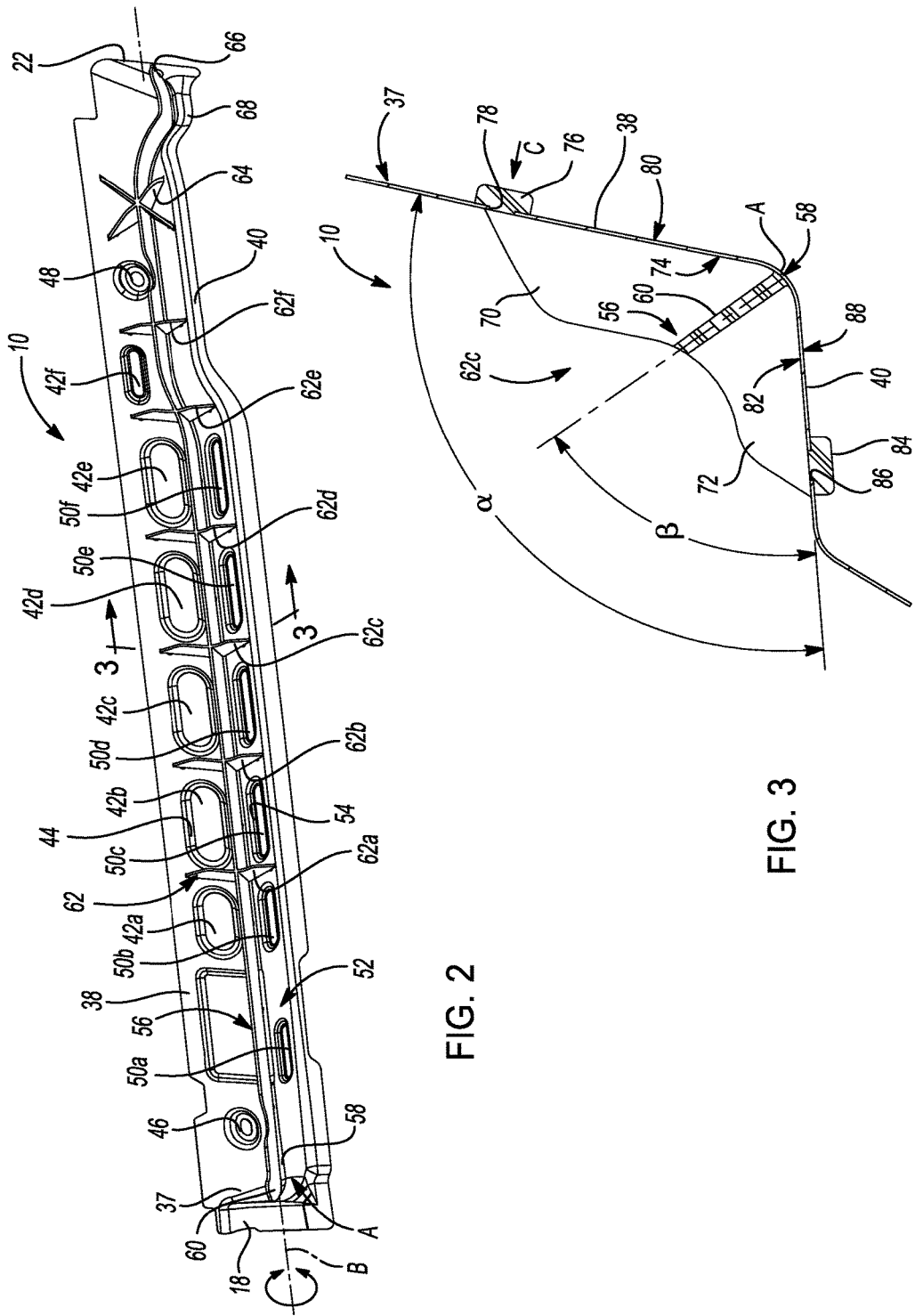
FIG. 2 is a front left perspective view of the hybrid multi-material outerbelt reinforcement assembly of FIG. 1.
FIG. 3 is a cross sectional end elevational view taken at section 3 of FIG. 2.

With continued reference to FIG. 2, a material thickness of the first leg 38 and the second leg 40 can be further reduced to further reduce a weight of the outerbelt reinforcement assembly 10 while mitigating against longitudinal twisting of either of the first leg 38 or the second leg 40 with respect to a longitudinal axis "B". Torsional twisting of the body 37 is mitigated by the addition of a polymeric material reinforcing rib 56 having a rib end 58 contacting the body 37 at the junction "A" defined between the first leg 38 and the second leg 40. The reinforcing rib 56 includes a rib body 60 extending away from the junction "A" and spatially separated from each of the first leg 38 and the second leg 40 as will be shown in discussed in greater detail in reference to FIG. 3.

To mitigate against rotation of either the first leg 38 or the second leg 40 with respect to the longitudinal axis "B" defined through the junction "A", multiple flanges 62 are integrally connected to the reinforcing rib 56. Each of the flanges 62, such as flanges 62a, 62b, 62c, 62d, 62e, 62f are directly connected to both the first leg 38 and the second leg 40. The stiffness provided by the flanges 62a, 62b, 62c, 62d, 62e, 62f mitigates against rotation of the first leg 38 with respect to, such as toward or away from, the second leg 40. Where substantial shape changes may occur along the body 37, "X" shaped flanges, such as an "X" shaped flange 64 can also be used. The reinforcing rib 56 is shaped to follow a geometry of the body 37. According to several aspects, the reinforcing rib 56 has a length extending for substantially an entire length of the body 37, except at the first end 18 and the second end 22, where the reinforcing rib 56 can include a connecting end such as a connecting end 66 adapted to fix to the second end 22. The shape of the reinforcing rib 56 can also match more severe geometric changes in the body 37, such as to match a curve shaped portion 68 of the body 37. According to further aspects, the reinforcing rib 56 can be provided in two or more segments each having a length less than the entire length of the metal body 37. It is desirable that the reinforcing rib 56, either as a single unit or as multiple segments extend for more than 50% of the length of the metal body 37, and up to the entire length of the metal body 37.

Referring to FIG. 3 and again to FIGS. 1 through 2, according to several aspects, each of the flanges, such as the flanges 62a, 62b, 62c, 62d, 62e, 62f can have differing dimensions, but are similar in design, therefore the following discussion of the flange 62c applies equally to the other flanges. The multiple flanges each include a first flange member 70 directly contacting the first portion or leg 38 of the body 37 and a second flange member 72 directly contacting the second leg 40 of the body 37. The first flange member 70 and the second flange member 72 are integrally formed with the reinforcing rib 56, for example by during a common injection molding operation. The first flange member 70 has a geometry matching a geometry of an inner face 74 of the first leg 38, and directly contacts the inner face 74. To maintain direct contact between the first flange member 70 and the inner face 74, a first button 76 is also created from the polymeric material used for the reinforcing rib 56 and the flanges during the injection molding process. The polymeric material flows into a preformed aperture 78 created in the first leg 38 for example in a flow direction "C", while a portion of the polymeric material defining the first button 76 remains in direct contact with an outer face 80 of the first leg 38. The first button 76 is frictionally restricted by the aperture 78.

Similar to the first flange member 70, the second flange member 72 has a geometry matching a geometry of an inner face 82 of the second leg 40, and directly contacts the inner face 82. To maintain direct contact between the second flange member 72 and the inner face 82, a second button 84 is also created from the polymeric material used for the reinforcing rib 56 and the flanges during the injection molding process. The polymeric material flows into a preformed aperture 86 created in the second leg 40 while a portion of the polymeric material defining the second button 84 remains in direct contact with an outer face 88 of the second leg 40. The second button 84 is therefore frictionally restricted by the aperture 86.

With continuing reference to FIG. 3 and again to FIGS. 1 through 2, the reinforcing rib 56 is located with the rib end 58 contacting the body 37 at the junction "A" defined between the first leg 38 and the second leg 40. The rib body 60 extends away from the junction "A" and is spatially separated from each of the first leg 38 and the second leg 40. The body 37 is formed with the first leg 38 oriented at an angle alpha ($\alpha$) with respect to the second leg 40. Angle alpha can vary from an acute angle, a 90 degree angle, and an obtuse angle for different aspects of the outerbelt reinforcement assembly 10. Torsional twisting of the metal body 37 between one end to the other end can cause rotation of the first leg 38 with respect to the second leg 40, thereby tending to either increase or decrease angle alpha. The reinforcing rib 56 and the flanges mitigate against this torsional twisting. According to several aspects, the reinforcing rib 56 is oriented at an angle beta ($\beta$) which bisects the angle alpha, however angle beta can also be less than or greater than 50% of the angle defined by angle alpha depending on the desired geometry of the body 37. It is further noted that according to further aspects, the first button 76 and the second button 84 can be omitted, and the first flange member 70 and the second flange member 72 can be directly bonded, for example by chemical bonding, an adhesive, or the like to the inner faces 74, 82.

Referring now to FIG. 4 and again to FIGS. 1 through 3, according to additional aspects a motor vehicle outerbelt reinforcement assembly 100 is similar to the outerbelt reinforcement assembly 10, therefore only the differences will be discussed as follows. The outerbelt reinforcement assembly 100 includes a body 102 which is intended to be lighter weight compared to the body 37, and therefore is made from a metal such as aluminum, which can similarly be formed for example by a stamping operation. The body 102 includes a first member or leg 104 angularly oriented with respect to a second member or leg 106.

The use of aluminum material for the body 102 reduces weight compared to steel, but if the outerbelt reinforcement assembly 100 is intended to be welded to the door frame 12, a polymeric material adapter 108 is positioned between a first end 110 of the body 102 and a steel connector 112. Similarly, a polymeric material adapter 114 is positioned between a second end 116 of the body 102 and a steel connector 118. The steel connectors 112, 118 are provided to allow direct welding to the door frame 12 as discussed above with respect to FIG. 1.

Similar to outerbelt reinforcement assembly 10 torsional twisting is mitigated by the addition of a polymeric material reinforcing rib 120 having a rib end 122 contacting the body 102 at the junction "A1" defined between the first leg 104 and the second leg 106. The reinforcing rib 120 includes a rib body 124 extending away from the junction "A1" and which is spatially separated from each of the first leg 104 and the second leg 106. A total weight of the outerbelt reinforcement assembly 100 is reduced by the addition of multiple clear openings 128a, 128b, 128c, 128d, 128e, 128f created in the first leg 104. Multiple clear openings 130a, 130b, 130c, 130d, 130e, 130f are also created in an upward facing, substantially horizontal face 132 of the second leg 106. Each of the clear openings also includes a raised lip as discussed above for the outerbelt reinforcement assembly 100.

To mitigate against rotation of either the first leg 104 or the second leg 106 with respect to a longitudinal axis "B1"

defined through the junction "A1", multiple flanges 134 are integrally connected to the reinforcing rib 120. Each of the flanges 134, such as flanges 134a, 134b, 134c, 134d, 134e, 134f are directly connected to both the first leg 104 and the second leg 106. The stiffness provided by the flanges 134a, 134b, 134c, 134d, 134e, 134f mitigates against rotation of the first leg 104 with respect to, such as toward or away from, the second leg 106. The injection molded polymeric material defining the reinforcing rib 120 and the flanges 134 also flows during the injection molding process to integrally connect to the polymeric material adapter 108 and the polymeric adapter 114.

The multiple clear openings 128a, 128b, 128c, 128d, 128e, 128f created in the first leg 104 each having an opening centerline, such as centerlines 136, 138. The multiple clear openings 130a, 130b, 130c, 130d, 130e, 130f created in the upward facing, substantially horizontal face 132 of the second leg 106 also each have an opening centerline, such as centerlines 140, 142. These centerlines align where they intersect with the opening centerline of one of the clear openings 128a, 128b, 128c, 128d, 128e, 128f of the first leg 104 at the intersection of the centerlines with the longitudinal axis "B1" defined through the junction "A1". A centerline of each of the flanges 134, such as the flange 134b are centrally positioned between successive clear opening centerlines such as centerlines 136, 138 so the flanges 134 are substantially centrally positioned between successive ones of the clear openings.

Referring to FIG. 5, and again to FIGS. 1 and 4, each of the steel connectors 112, 118 of the outerbelt reinforcement assembly 100 are similarly installed, therefore the following discussion of the steel connector 118 applies equally to steel connector 112. The polymeric material adapter 114 includes a first adapter portion 146 which is connected to the second end 116 of the body 102 using multiple polymeric material buttons. The steel connector 118 is attached to the polymeric material adapter 114 using multiple polymeric material buttons 156 applied at the time of injection molding of the polymeric material adapter 114. The second leg 106 of the body 102 is partially covered by a second adapter portion 150 of the polymeric material adapter 114. One or multiple part alignment apertures 152 are provided in the polymeric material adapter 114 to connect the steel connector 118 to the polymeric material adapter 114. A third adapter portion 154 of the polymeric material adapter 114 is connected to the steel connector 118 using multiple polymeric material buttons 156 applied at the time of injection molding of the polymeric material adapter 114. The polymeric material adapter 114 therefore also provides a galvanic disconnect between the dissimilar metals of the aluminum body 102 and the steel connector 118 and sufficient spacing between the polymeric material of the polymeric material adapter 114 and the heated zone for the weld location of the steel connector 118.

According to several aspects, a motor vehicle outerbelt reinforcement assembly 10 includes a metal body 37. The body 37 has a first leg 38 and a second leg 40 oriented at an angle (α) with respect to the first leg 38. The second leg 40 is integrally connected to the first leg 38 defining a junction "A". Multiple clear openings 42a, 42b, 42c, 42d, 42e, 42f are created in the first leg 38 each having an opening centerline. Multiple clear openings 50a, 50b, 50c, 50d, 50e, 50f are created in the second leg 40 each having an opening centerline aligned with one of the opening centerlines of one of clear openings 42a, 42b, 42c, 42d, 42e, 42f of the first leg 38. A polymeric material reinforcing rib 56 has a rib end 58 contacting the junction "A" between the first leg 38 and the second leg 40 and has a rib body 60 extending away from the junction "A" and bisecting the angle (α) defined between the first leg 38 and the second leg 40. The reinforcing rib 56 has a rib length extending for substantially an entire length of the metal body 37. According to further aspects, the reinforcing rib 56 can be provided in two or more segments each having a length less than the entire length of the metal body 37. It is desirable that the reinforcing rib 56, either as a single unit or as multiple segments extend for more than 50% of the length of the metal body 37, and up to the entire length of the metal body 37.

Multiple flanges 62a, 62b, 62c, 62d, 62e, 62f are integrally connected to the reinforcing rib 56, each of the flanges 62a, 62b, 62c, 62d, 62e, 62f having a first flange portion 70 connected to the first leg 38 and a second flange portion 72 connected to the second leg 40 to mitigate against a torsional rotation of the metal body 37 that increases or decreases the angle (α), thereby inducing the first leg 38 to rotate with respect to the second leg 40. Each of the multiple flanges 62a, 62b, 62c, 62d, 62e, 62f is positioned between successive ones of the clear openings 42a, 42b, 42c, 42d, 42e, 42f of both the first portion and the clear openings 50a, 50b, 50c, 50d, 50e, 50f of the second portion.

It is noted that items identified herein as being a stamping of a metal material can also be provided as cast, forged, or extruded structures.

The description of the invention is merely exemplary in nature and variations that do not depart from the gist of the invention are intended to be within the scope of the invention. Such variations are not to be regarded as a departure from the spirit and scope of the invention.

The following is claimed:

1. A hybrid multi-material outerbelt reinforcement assembly for a motor vehicle door frame, comprising:
    a metal body, the metal body having a first portion and a second portion integrally connected to the first portion defining a junction, the second portion oriented at an angle with respect to the first portion;
    a polymeric material reinforcing rib having a rib end contacting the metal body generally at the junction defined between the first portion and the second portion, and having a rib body extending away from the junction and spatially separated from each of the first portion and the second portion; and
    multiple flanges integrally connected to the reinforcing rib, each of the flanges directly connected to both the first portion and the second portion to mitigate against a torsional rotation of the metal body that increases or decreases the angle of the second portion with respect to the first portion.

2. The hybrid multi-material outerbelt reinforcement assembly of claim 1, wherein each of the multiple flanges includes at least one button positioned oppositely about the metal body with respect to the reinforcing rib and the flanges, the at least one button acting to frictionally retain the reinforcing rib and the flanges in direct contact with the metal body.

3. The hybrid multi-material outerbelt reinforcement assembly of claim 2, wherein the multiple flanges each include a first flange member directly contacting the first portion of the metal body and a second flange member directly contacting the second portion of the metal body.

4. The hybrid multi-material outerbelt reinforcement assembly of claim 3, wherein the at least one button defines a first button integrally connected to the first flange member and a second button integrally connected to the second flange member.

5. The hybrid multi-material outerbelt reinforcement assembly of claim 2, wherein the at least one button defines multiple buttons each extending through one of multiple apertures created in the first portion or the second portion.

6. The hybrid multi-material outerbelt reinforcement assembly of claim 1, further including multiple buttons positioned oppositely about the metal body with respect to the flanges, the multiple buttons together acting to frictionally retain the reinforcing rib and the multiple flanges in contact with the metal body;
wherein each of the multiple buttons individually extend through one of multiple apertures created in the metal body to integrally connect to one of the multiple flanges.

7. The hybrid multi-material outerbelt reinforcement assembly of claim 1, further including:
multiple through openings created in the first portion each having an opening centerline; and
multiple through openings created in the second portion each having an opening centerline aligned with the opening centerline of one of through openings of the first portion.

8. The hybrid multi-material outerbelt reinforcement assembly of claim 7, wherein each of the multiple flanges is positioned between successive ones of the through openings of both the first portion and the second portion.

9. The hybrid multi-material outerbelt reinforcement assembly of claim 7, wherein a perimeter of each of the through openings includes a lip raised with respect to a plane defined by either the first portion or the second portion having the through opening.

10. The hybrid multi-material outerbelt reinforcement assembly of claim 1, wherein:
the metal body defines an aluminum material and includes opposed ends;
first and second polymeric material adapters are each connected to one of the opposed ends;
first and second steel ends are each connected to one of the first or second adapters with the first and second steel ends adapted to be welded to a vehicle door frame; and
the reinforcing rib has a rib length extending for substantially an entire combined length of the metal body and the first and second adapters.

11. The hybrid multi-material outerbelt reinforcement assembly of claim 1, wherein the reinforcing rib bisects the angle defined between the first portion and the second portion.

12. The hybrid multi-material outerbelt reinforcement assembly of claim 1, wherein the reinforcing rib has a rib length extending for substantially an entire length of the metal body.

13. A hybrid multi-material outerbelt reinforcement assembly for a motor vehicle, comprising:
a metal body, the metal body having a first leg and a second leg oriented at an angle with respect to the first leg, the second leg integrally connected to the first leg defining a junction;
a polymeric material reinforcing rib having a rib end contacting the junction between the first leg and the second leg and having a rib body extending away from the junction and bisecting the angle defined between the first leg and the second leg, the reinforcing rib having a rib length extending for substantially an entire length of the metal body; and
multiple flanges integrally connected to the reinforcing rib, each of the flanges having a first flange portion and a second flange portion each contacting the metal body to mitigate against a torsional rotation of the metal body that increases or decreases the angle of the second leg with respect to the first leg.

14. The hybrid multi-material outerbelt reinforcement assembly of claim 13, wherein a first button of each of the first flange portions fixes the first flange portion of each of the flanges to the first leg, and a second button of each of the second flange portions fixes the second flange portion of each of the flanges to the second leg.

15. The hybrid multi-material outerbelt reinforcement assembly of claim 14, wherein the reinforcing rib, the flanges and each of the first button of each of the first flange portions and the second button of each of the second flange portions are all integrally joined during a single injection molding operation.

16. The hybrid multi-material outerbelt reinforcement assembly of claim 13, wherein the first flange portion of each of the flanges is bonded to the first leg and the second flange portion of each of the flanges is bonded to the second leg.

17. The hybrid multi-material outerbelt reinforcement assembly of claim 13, wherein the first flange portion is directly fixed to the first leg.

18. The hybrid multi-material outerbelt reinforcement assembly of claim 17, wherein the second flange portion is directly fixed to the second leg.

19. The hybrid multi-material outerbelt reinforcement assembly of claim 13, wherein the first flange portion of each of the flanges is bonded to the first leg and the second flange portion of each of the flanges is bonded to the second leg.

20. A hybrid multi-material outerbelt reinforcement assembly for a motor vehicle, comprising:
a metal body, the metal body having a first leg and a second leg oriented at an angle with respect to the first leg, the second leg integrally connected to the first leg defining a junction;
multiple through openings created in the first portion each having an opening centerline;
multiple through openings created in the second portion each having an opening centerline aligned with the opening centerline of one of through openings of the first portion;
a polymeric material reinforcing rib having a rib end contacting the junction between the first leg and the second leg and having a rib body extending away from the junction and bisecting the angle defined between the first leg and the second leg, the reinforcing rib having a rib length extending for substantially an entire length of the metal body; and
multiple flanges integrally connected to the reinforcing rib, each of the flanges having a first flange portion connected to the first leg and a second flange portion connected to the second leg to mitigate against a torsional rotation of the metal body that increases or decreases the angle of the second leg with respect to the first leg;
wherein individual ones of the multiple flanges are positioned between successive ones of the through openings of both the first portion and the second portion.

* * * * *